United States Patent [19]

Goodell et al.

[11] Patent Number: 4,687,650

[45] Date of Patent: Aug. 18, 1987

[54] METHODS OF EXTRACTING HYDROGEN FROM A GAS

[75] Inventors: Paul D. Goodell, Ridgewood, N.J.; Ernest L. Huston, Tuxedo Park, N.Y.; Peter S. Rudman; Gary D. Sandrock, both of Ringwood, N.J.

[73] Assignees: Ergenics, Inc., Wyckoff, N.J.; Air Products and Chemicals, Inc., Allentown, Pa.

[21] Appl. No.: 833,066

[22] Filed: Feb. 26, 1986

Related U.S. Application Data

[62] Division of Ser. No. 279,713, Jul. 2, 1981, Pat. No. 4,589,919.

[51] Int. Cl.$^4$ .............................................. C01B 1/26
[52] U.S. Cl. ........................................ 423/248; 55/68; 423/645

[58] Field of Search ............... 423/248, 645; 55/74, 55/68; 502/406

[56] References Cited

U.S. PATENT DOCUMENTS

| | | | |
|---|---|---|---|
| 4,360,505 | 11/1982 | Sheridan et al. | 423/248 |
| 4,360,569 | 11/1982 | Steyert et al. | 423/248 |
| 4,444,727 | 4/1984 | Yanagihara et al. | 423/248 |
| 4,566,281 | 2/1979 | Sandrock et al. | 55/74 |
| 4,589,919 | 5/1986 | Goodell et al. | 75/251 |

*Primary Examiner*—Bernard Nozick
*Attorney, Agent, or Firm*—Charles E. Baxley

[57] ABSTRACT

The method for extracting hydrogen from a gas stream containing hydrogen with or without other gases by a sorption-desorption process using as the hydrogen sorber a pellet bed of a porous, metallurgically bonded, heat-ballasted hydridable mixture comprising a major proportion of a heat-ballast material and a minor proportion of a hydridable metallic material.

2 Claims, No Drawings

METHODS OF EXTRACTING HYDROGEN FROM A GAS

This is a division of application Ser. No. 279,713 filed July 2, 1981, now U.S. Pat. No. 4,589,919.

The present invention is directed to a heat ballasted hydridable material and to the use of the material in conducting hydride/dehydriding cycles under improved kinetics.

BACKGROUND OF THE INVENTION AND PRIOR ART

In recent years considerable research effort has been expended in investigating the properties of hydridable materials, for example, materials having the structural formula of $LaNi_5$. These fascinating metallic materials have the capability of absorbing large amounts of hydrogen and of releasing their hydrogen content, i.e., they are reversibly hydridable. The use of such materials as hydrogen-storage media has been visualized as being industrially important, particularly in view of the fact that the materials can absorb hydrogen to a density greater than that which is provided by liquid hydrogen. It has been found that a number of engineering problems are encountered in dealing with these materials which must be solved before satisfactory commercial devices capable of repeatedly absorbing and desorbing hydrogen for useful purposes can be devised. It is found that when these materials are subjected to hydrogen and hydrogen is absorbed that heat is generated i.e., the reaction is exothermic. However, in order to persuade the resulting metal hydride to release its hydrogen content, the hydride must be heated, i.e., dehydriding is endothermic. It had been believed that an industrial size device designed to handle substantial quantities of hydrogen would require transport of considerable quantities of heat in or out of the device depending upon whether the device was in an hydrogen-absorbing or hydrogen-releasing mode. The apparent necessity for the provision of elaborate heat transfer means in order for the device to operate would have meant a complex and expensive device with many tubes, valves and pumps.

Another factor requiring consideration was based on the observation that, during repeated hydriding and dehydriding cycles, the hydridable materials (which may initially be relatively large in particle size) crack and undergo decrepitation due to the change in volume which accompanies the hydriding/dehydriding cycles. The finely divided debris resulting from the decrepitation reaction provides additional problems in containment and complicates the design of the containment device in terms of valves, filters, etc. In addition it has been found that the fine decrepitated powder resulting from the action of the hydriding/dehydriding cycle upon the hydridable material tends to pack in the containment device with high impedance to gas flow, and undesirable increases in pressure within the device unless appropriate design steps are taken to compensate for this effect. It has been found that the problem of moving heat in and out of a device containing the hydridable material can be minimized by including a heat storage medium with a hydride former, and this forms the subject matter of U.S. patent application Ser. No. 011,194 filed Feb. 12, 1979 now U.S. Pat. No. 4,566,281. However, the problem of decrepitation of the hydride former leading to excessive bed packing, blockage of filters, difficulty with valves, etc. still remains. In addition, the nature of the heat storage medium to be employed in connection with the hydride former is still susceptible of improvement. It is known from U.S. Pat. No. 4,110,425 that various hydrogen-storage materials of types such as magnesium, titanium, vanadium and niobium and alloys such as those of lanthanum and titanium with cobalt, nickel and iron may be bonded with various plastics and remain useful as hydrogen-storage media. It would be expected, however, that plastics would have limited strength and limited capability to resist elevation in temperature. Plastic-bonded pellets placed in beds of any substantial size and weight could thus be expected to slump or creep with accompanying reduction in bed permeability to gas flow. Furthermore, the potential for gas evolution from the plastic binder over an extended period of time exists and such gas evolution could serve as a contaminant in applications wherein hydrogen of high purity is required. The afore-mentioned patent refers in turn to U.S. Pat. Nos. 3,669,745 and 3,881,960 which are directed to electrodes for use in galvanic cells comprising mixtures of a hydride former and of another metal in powder form which are pressed and sintered U.S. Pat. No. 4,036,944 is also directed to hydrogen sorbent compositions comprising lanthanum-nickel bonded with a plastic composition. This patent also contemplates the inclusion of minor amounts of coppet, nickel and iron metals in the plastic bonded compact. The patent reports on a failed experiment wherein 50 wt percent of copper powder was introduced with the $LaNi_5$. After two cycles of hydrogenation the resulting compacts disintegrated.

SUMMARY OF THE INVENTION

The invention is directed to powder metallurgical mixtures of a hydride forming metallic material in a minor proportion with a major proportion of a metal which is essentially non-hydridable and acts as a heat ballast. The powder metallurgy compacts produced in accordance with the invention are individually porous and beds made of the individual compacts or pellets are porous on a macroscale. The material provided in accordance with the invention may be employed, as an example, in conducting cyclic hydride/dehydride reactions with improved kinetics. The porous compacts provided in accordance with the invention are essentially resistant to decrepitation over long periods of time, and beds made of the compacts are readily permeable to gas passage.

DETAILED DESCRIPTION OF THE INVENTION

A hydridable material employed in accordance with the invention may include pure metals, such as magnesium, titanium, vanadium, niobium and palladium and binary, tertiary and more complex alloys of, for example, rare earths, titanium, cobalt, nickel, iron, zirconium, magnesium, calcium, manganese and mixtures and other combinations thereof. Illustrative examples are $LaNi_5$, $LaNi_{4.7}Al_{0.3}$, $LaNi_{5-x}Al_x$, $LaCo_5$, $LaNi_3Co_2$, FeTi, $(Fe_{1-x},Mn_x)Ti$, $Mg_2Ni$ and $Ti_2Ni$. Metallic materials in powder from which may be mixed with the aforementioned hydridable material as ballast include in particular iron, nickel, copper and aluminum. Alloys or mixtures of these metals may also be employed in powder form. The heat-ballast metal also serves the function of binder to hold the composite, porous, powder metallurgical structure together. Care should be taken to avoid the potential for exothermic reaction between the metal binder or ballast and the hydridable material. For example, a reaction between aluminum and LaNi$_5$ may initiate at temperatures as low as 300° C. Preferably, the heat-ballast metal comprises at least about 60%, by volume, of the pellets.

In preparing compacts in accordance with the invention, a powdered hydridable material having a particle size of about 1 to about 700 microns, e.g., about 10 to about 300 microns, is mixed with the ballast metal or alloy powder also having a particle size in the same range; is pressed, for example, at pressures in the range of up to about 20,000 lbs/in$^2$ or higher and is sintered, if necessary, in the range of about 400° to about 1100° C., appropriate to the metallurgical nature of the compact ingredients. The resulting compacts may be crushed to provide pellets of an average size in a range of about 1 to about 10 millimeters. Crushing of larger compacts to provide such pellets also provides fresh, fractured faces and overcomes metal smearing effects of the powder mix against the die which may occur with softer metals such as aluminum and copper. Alternatively, pellets may be formed directly by powder metallurgical methods which have sizes in the range of about 2 to about 30 millimeters. Tabletting, briquetting, roll compaction, etc. may be employed. Porosity of individual pellets will usually range in the vicinity of about 20% to about 60% pores or voids. Preferably the porosity falls in the range of about 20% to about 40%, by volume. Such pellets are readily permeable to hydrogen. In the physical structure of the pellet itself, the hydridable particles are readily available for contact with gas and despite the fact that there is a smaller amount of hydridable material than of ballast material in the pellet the hydriding and dehydriding reactions proceed rapidly. Since the ballast material is in contact with the hydridable material, flow of heat from the hydridable material to the ballast material or in reverse direction involves a very short distance indeed, leading to improved kinetics.

In carrying out a hydriding-dehydriding process, as for example, the recovery of substantially pure hydrogen from a hydrogen-containing gas stream also containing undesirable impurity gases, the hydrogen-containing stream will usually be under pressure. The hydride-dehydride device containing a bed of heat-ballasted hydridable material provided in accordance with the invention will have a theoretical maximum capacity for hydrogen, an ascertainable total heat of reaction for capacity storage and an ascertainable heat capacity. The bed will possess an equilibrium absorbing pressure which rises with temperature. Sufficient heat storage capacity should be available in the bed in relation to the quantity of hydridable material that the equilibrium absorbing pressure will not reach the supply pressure of hydrogen until 60% or more of the hydrogen storage capacity of the sorbent material is realized. The heat storage capacity of the bed advantageously will be sufficient to permit absorption of the theoretical maximum heat of the hydrogen sorbing reaction without the equilibrium absorption pressure exceeding the supply pressure of the hydrogen gas. Once the bed is hydrided at the supply pressure of the hydrogen gas, hydrogen of substantial purity may be recovered from the bed utilizing the reaction heat stored therein. Efficiency of hydrogen extraction from the bed will be inversely proportional to the rate of hydrogen extraction. No auxiliary heat transfer means is required, although auxiliary heat transfer means or insulation may be employed.

It is found in preparing pellets in accordance with the invention that the oxygen content of the ballast metal powder should be carefully controlled. Thus, the oxygen content of the ballast metal powder should not exceed about 0.1 percent by weight. More highly oxidized powders can be improvHbvHd in relation to oxygen content by reduction in hydrogen at temperatures up to about 500° C. Such a reducing step may involve some sintering of the powder and necessitate crushing to provide metal powder of the appropriate particle size. Of course in such a situation care needs to be taken to avoid oxidation of the metal powder during crushing or other processing to provide composite pellets. Such reoxidation can be corrected by moderate heating of the composite particles in a reducing atmosphere low in hydrogen.

It will be appreciated that aluminum oxide is not reducible with hydrogen. Other ballast metals and/or alloys possess different advantages including the potential for absorbing or catalytically converting certain gaseous impurities in the hydrogen feed stream which could have the potential for poisoning the hydridable material. The powder metallurgy compacts of the invention may also contain up to about 30%, by volume, of inert, refractory powdered material such as alumina, sillica, magnesia, etc. The inert material should have a particle size in the range of about 50 to about 500 microns and sufficient metal binder should be present to provide a strong, metal-bonded pellet.

Oxygen has been found to play a destructive role in relation to reduction of the hydrogen capacity of hydridable materials employed in composites of the invention. Such hydridable materials are readily oxidizable, and oxidized material is no longer hydridable. It appears that hydrogen-reducible oxygen associated with the metal ballast is reduced when the bed is hydrided. Hydriding is accompanied by a rise in temperature and the water generated during reduction of the metal oxide apparently reacts with the hydridable material with accompanying loss of capacity.

EXAMPLE I

A number of pellets were produced in accordance with the invention using as ballast metals varying amounts of powdered iron, copper, aluminum and nickel. In each case LaNi$_5$ was employed as the hydridable material. The metal powders had fine particle sizes of less than 44 microns and the LaNi$_5$ was reduced to a fine particle size by several hydriding-dehydriding cycles. The powders were mixed by wire blending and the mixes were pressed at 20,000 psi isostatically to provide 10 kg billets of various sizes up to 10 kg. Pressing and sintering parameters are provided in Table I. The billets were crushed pior to use to pellets having a particle size range of about −4, +20 mesh.

The capacity data in Table I which are tabulated in the column ΔH/M wherein H is equal to the gram atoms of hydrogen in the hydridable material and M is equal to the gram atoms of hydridable material were obtained in closed or a deadend apparatus over at least five hydriding-dehydriding cycles under quasi-isothermal conditions. It is to be seen from the data that the highest ΔH/M value is that obtained on the aluminum bonded material, thereby indicating that, under the ΔH/M criterion, aluminum is the most satisfactory bonding metal to be employed in accordance with the invention. It is possible that the basic reason for the superior performance of the aluminum bonded hydridable material has to do with the fact that aluminum oxide has a high heat of formation and that oxygen transfer from the aluminum to the active element lanthanum of the hydridable material of the composite does not occur. In contrast metals such as nickel, copper and iron form oxides having relatively low heats of formation and in the presence of hydrogen the oxides of these metals are reduced rather readily with transfer of oxygen therefrom to the lanthanum or other active metal of the hydridable species in the composite. Such an oxygen transfer is accompanied by loss of capacity as is illustrated in Table I.

TABLE I

| Ident. No. | w/o Ballast | Pelletizing Pressure ton/in$^2$ | Sinter Tmp. °C. | LaNi$_5$ | Δ (H/M) | Pellet Den. g/cm$^3$ Prehyd. | Pellet Den. g/cm$^3$ Dehyd. | Max density g/cm$^3$ | Porosity % Prehyd. | Porosity % Dehyd. | Comments |
|---|---|---|---|---|---|---|---|---|---|---|---|
| LN-3 | 75 Fe | 10 | 760 | pulverized by prehydriding | 0.59 | | 3.92 | 7.29 | | 46.3 | 1.6 w/o O |
| LN-6 HR-462 | 75 Cu | " | " | pulverized by prehydriding | 0.89 | | 5.51 | 8.73 | | 36.9 | 0.48 w/o O |
| LN-8 | 60 Al | 2 | 430 | pulverized by prehydriding | 0.99 | 2.62 | 2.52 | 3.69 | 29.1 | 31.6 | |
| LN-12 | 82.5 Ni | 11 | 760 | pulverized by prehydriding | 0.92 | 4.59 | | 8.77 | 47.6 | | 0.18 w/o O |
| LN-13 | " | " | " | −100, +200 mesh | 0.92 | 5.15 | 4.90 | " | 41.3 | 44.1 | 0.12 w/o O |
| LN-14 | " | 38 | " | −200 +100 mesh | 0.89 | 6.30 | 5.97 | " | 28.1 | 31.9 | Chip before sinter |
| LN-16 | " | 16 | " | " | 0.79 | 6.00 | 5.53 | " | 31.6 | 37.0 | |
| LN-17 | " | " | " | −14, +30 mesh | 0.29 | 6.00 | | " | 31.6 | | |
| LN-18 | " | " | " | −14 mesh | 0.66 | 5.76 | 5.25 | " | 34.3 | 40.2 | |
| LN-15 | 82.5 Cu | 38 | " | −30, +100 mesh | 0.73 | 6.99 | 6.78 | 8.79 | 20.5 | 22.9 | Chip before sinter |
| LN-19 HR-470 | " | 25 | " | " | 0.61 | 6.74 | 6.45 | " | 23.4 | 26.6 | |
| LN-20 | " | " | " | −14, +30 mesh | 0.20 | 6.99 | 6.66 | " | 20.5 | 24.2 | |
| LN-21 | " | " | " | −14 mesh | 0.47 | 6.47 | 6.36 | " | 26.6 | 27.6 | |
| HR-421 | 75 Ni | | " | pulverived by prehydriding | 0.99 | | 5.12 | 8.71 | | 41.2 | | d = density = 8.20 (LaNi$_5$) = 8.90 (Ni) = 8.92 (Cu) = 7.03 (Fe) = 2.70 (Al)
$i/d_{max}$ = (w/o A)/d$_A$ + (w/o B)/d$_B$ 100
Porosity = 1 − d/d$_{max}$

EXAMPLE II

The kinetics in hydride/dehydride reactions as between LaNi$_5$ as loose powder and the same quantity of LaNi$_5$ produced as powder metallurgy pellets with fine nickel powder in the ratio 25% LaNi$_5$ and 75% nickel by weight were compared. A dead-end reactor made from a 0.75" diameter tube having a wall thickness of 0.0675 inches immersed in a 25° C. water bath was used. A quantity of 8 grams LaNi$_5$ was used in each test. Times for half reactions (ΔH/M=0.5) were used to measure reaction kinetics. The following results were obtained:

TABLE II

| | Absorption | |
|---|---|---|
| P/P$_A$ | Powder | Half-time (minutes) Ballasted Pellet |
| 1.5 | 2.3 | 0.75 |
| 2.0 | 1.3 | 0.25 |
| 4.0 | 0.41 | 0.045 |
| 6.0 | 0.25 | 0.019 |

| | Desorption | |
|---|---|---|
| P/P$_D$ | Powder | Half-time (minutes) Ballasted Pellet |
| 0.5 | 2.4 | 1.3 |
| 0.2 | 1.3 | 0.70 |
| 0.07 | 0.92 | 0.5 |

P$_A$ = measured absorption plateau pressure at 25° C.
P$_D$ = measured desorption plateau pressure at 25° C.

Two factors are believed to account for the improvement in kinetics which is made evident by the markedly reduced times shown in Table II: the intimately mixed ballast and the reduced pressure drop in the pellet bed.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A method for extracting hydrogen from a gas stream containing hydrogen with or without other gases by a sorption-desorption process using as the hydrogen sorber a bed of a porous, metallurgically bonded, heat-ballasted hydridable mixture in pellet form consisting of at least 60% by volume of a heat-ballast metal powder and not more than 40% by volume of a hydridable metal.

2. The method in accordance with claim 1 wherein said heat ballast material is a metal from the group consisting of nickel, copper, iron and aluminum.

* * * * *